United States Patent
Habermas

(10) Patent No.: US 7,366,589 B2
(45) Date of Patent: Apr. 29, 2008

(54) METHOD AND SYSTEM FOR REMOTE REFLASH

(75) Inventor: Stephen C. Habermas, Beverly Hills, MI (US)

(73) Assignee: General Motors Corporation, Detroit, MI (US)

( * ) Notice: Subject to any disclaimer, the term of this patent is extended or adjusted under 35 U.S.C. 154(b) by 712 days.

(21) Appl. No.: 10/845,506

(22) Filed: May 13, 2004

(65) Prior Publication Data

US 2005/0256614 A1 Nov. 17, 2005

(51) Int. Cl.
*G06F 19/00* (2006.01)
(52) U.S. Cl. .............................. 701/1; 701/33; 717/173; 717/178
(58) Field of Classification Search .................... 701/1, 701/29, 33; 709/203; 717/171–173, 176–178
See application file for complete search history.

(56) References Cited

U.S. PATENT DOCUMENTS

| | | | |
|---|---|---|---|
| 5,787,367 A * | 7/1998 | Berra .............................. 701/1 |
| 6,799,101 B2 * | 9/2004 | Hawig et al. ................... 701/35 |
| 6,928,362 B2 * | 8/2005 | Meaney ........................ 701/115 |
| 6,981,150 B2 * | 12/2005 | Little et al. .................. 713/191 |
| 2002/0035429 A1 * | 3/2002 | Banas .......................... 701/115 |
| 2004/0078119 A1 * | 4/2004 | Luitje et al. ..................... 701/1 |
| 2004/0148073 A1 * | 7/2004 | Hawig et al. ................... 701/35 |
| 2004/0249558 A1 * | 12/2004 | Meaney ........................ 701/115 |
| 2006/0041337 A1 * | 2/2006 | Augsburger et al. ............ 701/1 |
| 2006/0130033 A1 * | 6/2006 | Stoffels et al. .............. 717/166 |
| 2006/0220900 A1 * | 10/2006 | Ceskutti et al. ........ 340/825.22 |
| 2006/0248172 A1 * | 11/2006 | Zurawka et al. ............. 709/220 |
| 2006/0259207 A1 * | 11/2006 | Natsume ......................... 701/1 |
| 2007/0100513 A1 * | 5/2007 | Asano ............................ 701/2 |
| 2007/0112773 A1 * | 5/2007 | Joyce ............................. 707/9 |

* cited by examiner

*Primary Examiner*—Gary Chin

(57) ABSTRACT

A system and method for remote reflashing of software for electronic control units (ECUs). A method includes identifying vehicle groups for software updating 200, determining vehicles within the vehicle groups, each of the vehicles having a telematics device and a plurality of ECUs 202, preparing a software update package for each of the vehicles 204, transmitting the software update package over a wireless carrier system to the telematics device of each of the vehicles 206, and installing the software update package in at least one target ECU for each of the vehicles 208.

18 Claims, 2 Drawing Sheets

METHOD AND SYSTEM FOR REMOTE REFLASH

FIELD OF THE INVENTION

The invention relates to vehicles, and more particularly to methods and systems for remote reflashing of software through a mobile vehicle communication system.

BACKGROUND OF THE INVENTION

Vehicle systems, such as power train systems, body control systems, antilock braking systems, and the like, are increasingly controlled by one or more electronically controlled units (ECUs). Each ECU includes software for its particular vehicle system, such as operating control software and calibration files including gains and setpoints. The ECUs are responsive to driver demands and vehicle conditions to control the vehicle system operations. From time to time, the software is updated to reflect software improvements and corrections by reflashing software stored in flash memory and installing new software versions. Software is also updated to suit user preferences.

Software updates present several problems. Presently, the update depends on the owner bringing the vehicle to the dealer for the software update. The owner may not receive the notice of the update. The owner may skip a useful update due to the inconvenience in time and effort involved in taking the vehicle to the dealer. The vehicle manufacturer also incurs an expense, since the vehicle manufacturer typically reimburses the dealer for the update installation under the vehicle warranty.

Another problem with software updates is ensuring that the software version for a particular ECU is correct and compatible with the software versions present in other ECUs. In one example, a vehicle has a first ECU and a second ECU. If the first ECU is to be updated to a software version ECU1_1.1.2, the second ECU can be required to have software version ECU2_3.2.1 installed for the first ECU to operate properly. If the second ECU is using an older software version, such as ECU2_3.1.8, the second ECU must be updated before or at the same time that the first ECU is updated to software version ECU1_1.1.2.

Yet another problem with software updates occurs with replacement of an ECU. The dealer replaces the ECU and downloads the current software for the replaced ECU. The replaced ECU software may be incompatible with the software for other ECUs, which may result in sub-optimal vehicle performance.

It would be desirable to have a method and system for remote reflashing of software through a mobile vehicle communication system that overcomes the above disadvantages.

SUMMARY OF THE INVENTION

The present invention provides a method for remote reflashing of software for electronic control units (ECUs), including identifying vehicle groups for software updating, determining vehicles within the vehicle groups with each of the vehicles having a telematics device and a plurality of ECUs, preparing a software update package for each of the vehicles, transmitting the software update package over a wireless carrier system to the telematics device of each of the vehicles, and installing the software update package in at least one target ECU for each of the vehicles.

Another aspect of the invention provides a system for remote reflashing of software for electronic control units (ECUs), including means for identifying vehicle groups for software updating, means for determining vehicles within the vehicle groups with each of the vehicles having a telematics device and a plurality of ECUs, means for preparing a software update package for each of the vehicles, means for transmitting the software update package over a wireless carrier system to the telematics device of each of the vehicles, and means for installing the software update package in at least one target ECU for each of the vehicles.

Yet another aspect of the invention provides a computer readable medium for remote reflashing of software for electronic control units (ECUs), including computer readable code for identifying vehicle groups for software updating, computer readable code for determining vehicles within the vehicle groups with each of the vehicles having a telematics device and a plurality of ECUs, computer readable code for preparing a software update package for each of the vehicles, computer readable code for transmitting the software update package over a wireless carrier system to the telematics device of each of the vehicles, and computer readable code for installing the software update package in at least one target ECU for each of the vehicles.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
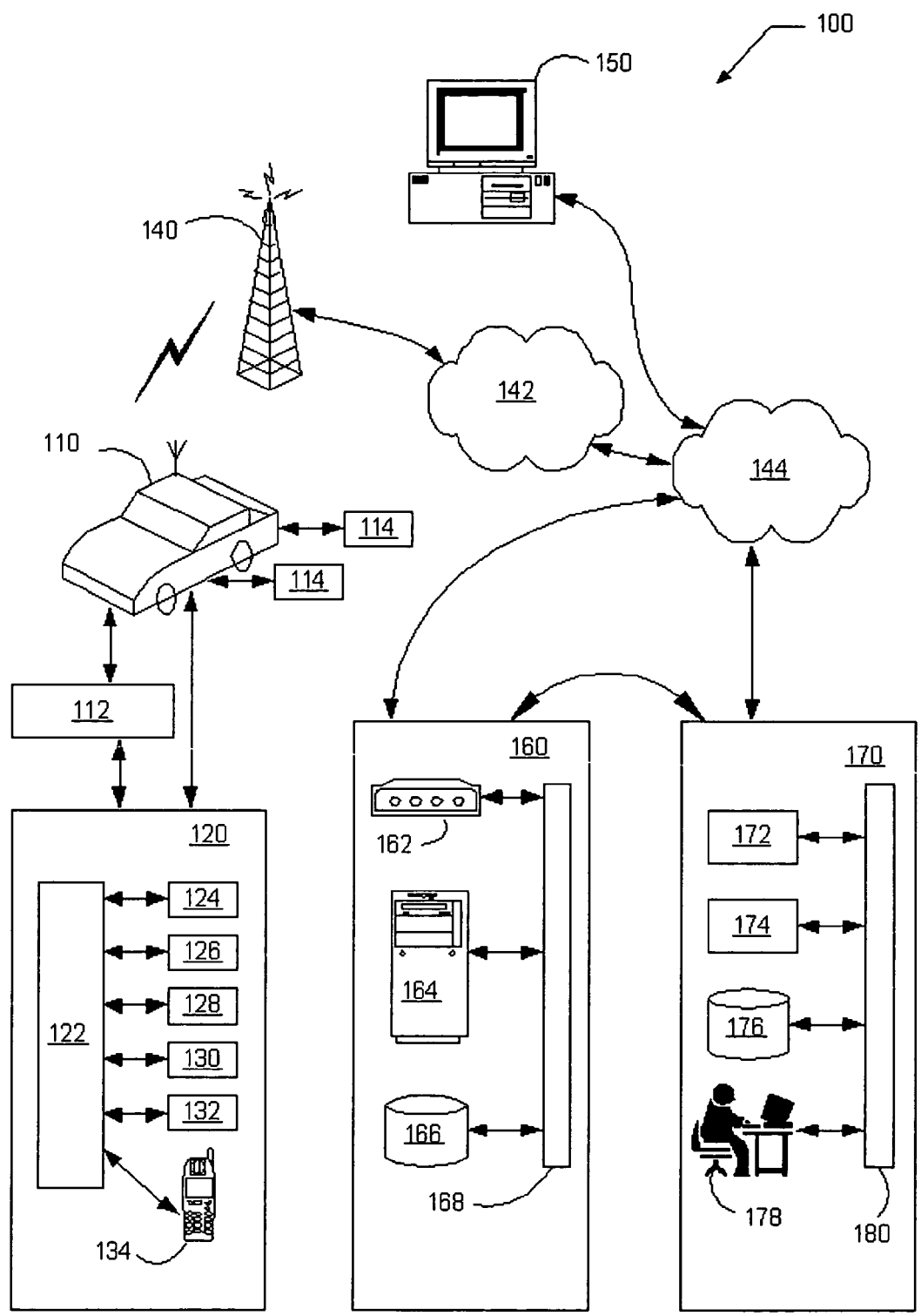
FIG. 1 is an illustrative operating environment for remote reflashing of software through a mobile vehicle communication system in accordance with one embodiment of the present invention.

FIG. 1 is an illustrative operating environment for remote reflashing of software through a mobile vehicle communication system in accordance with one embodiment of the present invention. FIG. 1 shows a mobile vehicle communication system 100. Mobile communication system 100 includes at least one mobile vehicle 110 (vehicle) including vehicle communication network 112 and telematics device 120; one or more wireless carrier systems 140; one or more communication networks 142; one or more land networks 144; one or more client, personal or user computers 150; one or more web-hosting portals 160; and one or more call centers 170. The mobile vehicle 110 includes a plurality of electronically controlled units (ECUs) 114 in communication with the telematics device 120. In one embodiment, mobile vehicle 110 is implemented as a vehicle equipped with suitable hardware and software for transmitting and receiving voice and data communications. The telematics device 120 is also called a vehicle communications unit (VCU) or a telematics unit.

In one embodiment, the telematics device 120 includes a processor 122 connected to a wireless modem 124, a global positioning system (GPS) unit 126, an in-vehicle memory 128 such as, for example, a non-volatile flash memory, a microphone 130, one or more speakers 132, and an embedded or in-vehicle mobile phone 134. In one embodiment, processor 122 is a microcontroller, controller, host processor, or vehicle communications processor. In an example, processor 122 is implemented as an application specific integrated circuit (ASIC). GPS unit 126 provides longitude and latitude coordinates of the vehicle, as well as a time and date stamp. In-vehicle mobile telephone system 134 is a cellular-type phone such as, for example, an analog, digital, dual-mode, dual-band, multi-mode, or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

Processor 122 executes various computer programs and communication control and protocol algorithms that affect communication, programming, and operational modes of electronic and mechanical systems within vehicle 110. In one embodiment, processor 122 is an embedded system controller. In another embodiment, processor 122 controls communications between telematics device 120, wireless carrier system 140, and call center 170. In yet another embodiment, processor 122 controls communications between the wireless modem 124 and nodes of a mobile ad hoc network. In still another embodiment, processor 122 provides processing, analysis, and control functions for determining engine emission performance for vehicle 110. Processor 122 is configured to generate and receive digital signals transmitted between telematics device 120 and a vehicle communication network 112 that is connected to various electronic modules in the vehicle 110. In one embodiment, the digital signals activate a programming mode and operation modes, as well as provide for data transfers. In another embodiment, a utility program facilitates the transfer of emission data, emission analysis data, instructions, triggers, and data requests between vehicle 110 and a call center 170.

Mobile vehicle 110, via a vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics device 120. In facilitating interactions among the various communication and electronic modules, vehicle communication network 112 utilizes interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Vehicle 110, via telematics device 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the S band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. in other embodiments, land network 144 is implemented as a wired network, an optical network, a fiber network, another wireless network, a virtual private network (VPN), or any combination thereof. Land network 144 is connected to one or more landline telephones. Land network 144 connects communication network 142 to computer 150, web-hosting portal 160, and call center 170. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160 and vehicle 110. Computer 150 sends data to web-hosting portal through a web-page interface using communication standards such as hypertext transport protocol (HTTP) and transport-control protocol Internet protocol (TCP/IP). In one embodiment, the data includes directives to change certain programming and operational modes of electronic and mechanical systems within vehicle 110. In another embodiment, the data includes requests for certain data such as vehicle system performance information. In operation, a user, such as, for example, a vehicle designer or manufacturing engineer, utilizes computer 150 to exchange information with mobile vehicle 110 that is cached or stored in web-hosting portal 160. In an embodiment, vehicle system performance information from client-side software is transmitted to server-side software of web-hosting portal 160. In one embodiment, vehicle system performance information is stored at web-hosting portal 160. In another embodiment, computer 150 includes a database (not shown) for storing received vehicle system performance data. In yet another embodiment, a private Local Area Network (LAN) is implemented for client computer 150 and web-hosting portal 160, such that web-hosting portal is operated as a Virtual Private Network (VPN).

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. Web-hosting portal 160 is connected to land network 144 by one or more data modems 162. Land network 144 transmits digital data to and from modem 162; data that is subsequently transferred to web server 164. In one implementation, modem 162 resides inside web server 164. Land network 144 transmits data communications between web-hosting portal 160 and call center 170.

Web server 164 receives various data, requests, or instructions from computer 150 via land network 144. In alternative embodiments, computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from computer 150 to telematics device 120 in vehicle 110. Web server 164 sends to or receives data transmissions from one or more databases 166 via network 168. In an embodiment, web server 164 includes computer applications and files for managing emission performance data.

In one embodiment, one or more web servers 164 are networked via network 168 to distribute vehicle engine emission performance data among its network components such as database 166. In an example, database 166 is a part of or a separate computer from web server 164. In one embodiment, web-server 164 sends data transmissions including vehicle system performance information to call center 170 via modem 162, and through land network 144.

Call center 170 is a location where many calls are received and serviced at the same time, or where many calls are sent at the same time. In one embodiment, the call center is a telematics call center, facilitating communications to and from telematics device 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics device 120 in mobile vehicle 110 through wireless carrier system 140 and/or wireless modem 124, communication network 142, and land network 144. Switch 172 receives data transmissions from and sends data transmissions to one or more web-hosting portals 160. Switch 172 receives data transmissions from or sends data transmissions to one or more communication services managers 174 via one or more networks 180.

Communication services manager 174 is any suitable hardware and software capable of providing communication services to telematics device 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends voice or data transmissions to switch 172.

Communication services manager 174 facilitates one or more services, such as, but not limited to, enrollment services, navigation assistance, directory assistance, roadside assistance, business or residential assistance, information services assistance, emergency assistance, communications assistance, and telematics retrieval of vehicle system performance information. Communication services manager 174 transmits and receives operational status, instructions, and other types of vehicle data to telematics device 120 in mobile vehicle 110 through wireless carrier system 140, communication network 142, land network 144, wireless modem 124, voice and data switch 172, and network 180. Communication services manager 174 stores or retrieves vehicle system performance information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at a service provider service center in verbal communication with a service subscriber in mobile vehicle 110 via telematics device 120. In another example, a virtual advisor is implemented as a synthesized voice interface responding to requests from telematics device 120 in mobile vehicle 110.

Communication services advisor 178 provides services to telematics device 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics device 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics device 120, which, in turn, sends an instructional signal or a voice call through wireless modem 124, wireless carrier system 140, communication network 142, and land network 144 to call center 170. In one embodiment, one or more triggers stored in the telematics device 120 cause the vehicle to initiate a service request. The trigger is, for example, a number of ignition cycles, a specific time and date, an expired time, a number of kilometers, an absolute Global Positioning System (GPS) timestamp, a request vehicle emission performance data and the like.

Mobile vehicle 110 includes a plurality of electronically controlled units (ECUs) 114. The ECUs 114 are responsive to driver demands and vehicle conditions to control vehicle system operations. Examples of vehicle systems including ECUs 114 are power train systems, body control systems, antilock braking systems, and the like. Each ECU 114 stores software for its particular vehicle system. Typically, the ECUs 114 include a processor for executing software and storage for storing software and data. In one embodiment, the storage includes flash memory that can be erased and rewritten to store new software and data. The software includes operating control software and calibration files, which include gain and setpoint values. The ECUs 114 are in communication with the telematics device 120 to send and receive information such as software, data, and status flags over the wireless carrier systems 140.

Figure 2:
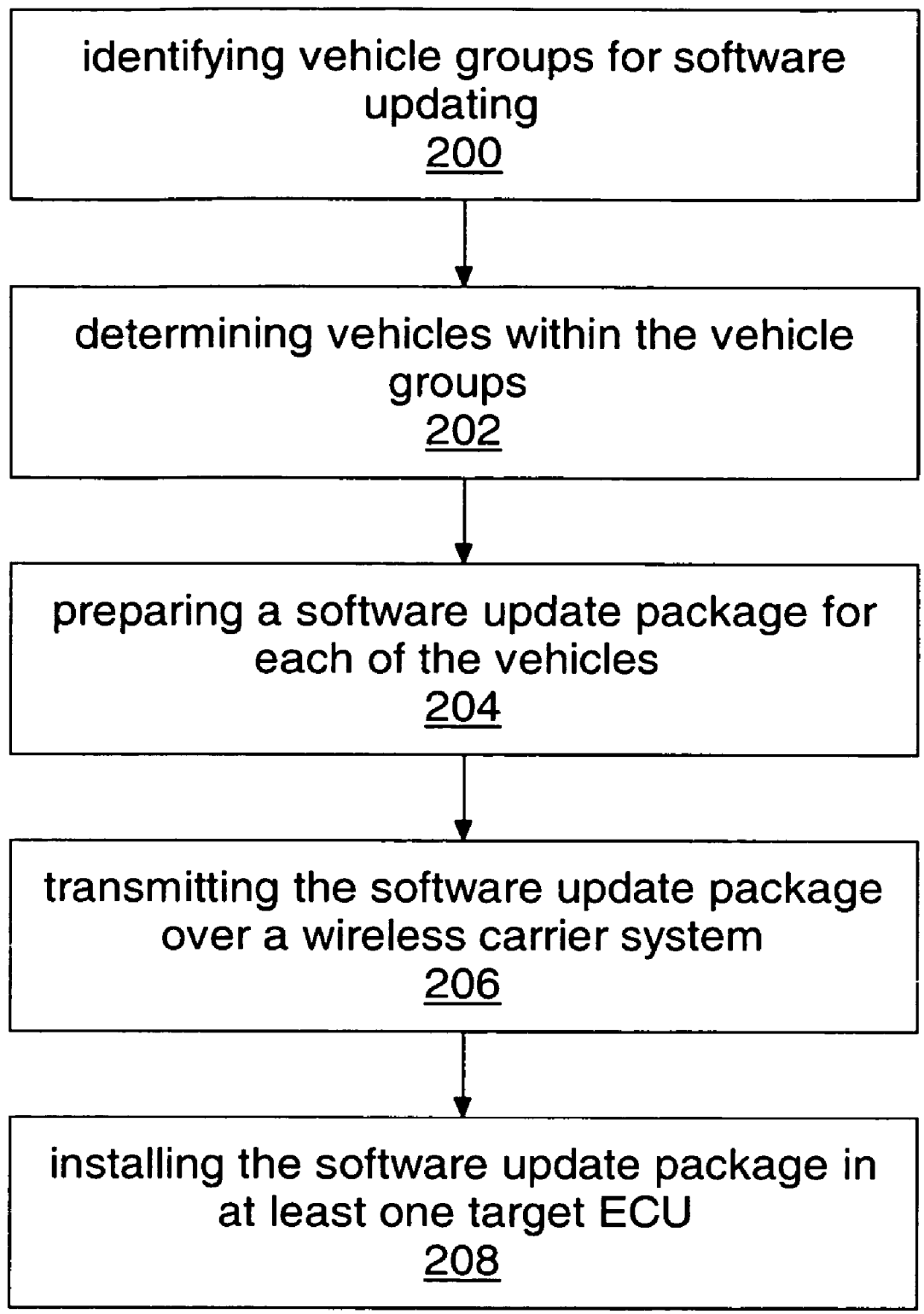
FIG. 2 is a flow diagram of a method for remote reflashing of software through a mobile vehicle communication system in accordance with one embodiment of the present invention.

FIG. 2 is a flow diagram of a method for remote reflashing of software through a mobile vehicle communication system in accordance with one embodiment of the present invention. The method includes identifying vehicle groups for software updating 200, determining vehicles within the vehicle groups, each of the vehicles having a telematics device and a plurality of ECUs 202, preparing a software update package for each of the vehicles 204, transmitting the software update package over a wireless carrier system to the telematics device of each of the vehicles 206, and installing the software update package in at least one target ECU for each of the vehicles 208. The method operates within an environment and using a system such as the exemplary system of FIG. 1. The method is embodied in a computer usable medium for remote reflashing of software for ECUs including computer readable code for executing the method described by FIG. 2.

Identifying vehicle groups for software updating 200 includes identifying groups of vehicles for which ECU software updating is desirable. The ECU software updating includes updating the ECU operating software and/or the ECU calibration file. ECU software updating is desirable for improving ECU operation, vehicle operation, vehicle operation for a particular driver profile or region, operating software functionality, and/or calibration file values, for example. In one embodiment, identifying vehicle groups for software updating 200 also includes performing preliminary software update planning, such as establishing a target ECU software version, determining ECU update criticality, identifying software dependencies with other ECUs, and/or establishing an update flash sequence when software dependencies exist.

Determining vehicles within the vehicle groups, each of the vehicles having a telematics device and a plurality of ECUs 202, includes determining specific vehicles, typically by vehicle identification number (VIN), for which the software updating is desired. In one embodiment, the vehicles are determined by searching a vehicle information database, such as databases at the call center or web-hosting portal, for vehicles having at least one key parameter such as ECU model number, installed ECU software version, installed ECU calibration file version, driver profile, operating region, or the like.

Preparing a software update package for each of the vehicles 204 includes preparing the software update package to be transmitted over a wireless carrier system to the vehicle for installation. In one embodiment, the software update package is prepared at the call center or web-hosting portal. The software update package includes reflash execution instructions for the vehicle software update and target ECU software for each ECU to be updated. The vehicle telematics device is responsive to the reflash execution instructions to control the manner and sequence of the ECU software installation. In one embodiment, the software update package includes the required vehicle state for the software update, e.g., inactive and stationary. In an alternative embodiment, the software update package includes vehicle diagnostic tests to be performed after the software update. In yet another alternative embodiment, the software update package includes ECU diagnostic tests to be performed after each ECU software installation. In yet another alternative embodiment, the software update package includes the installed ECU software version and/or the installed ECU calibration file version.

In preparing a software update package, the target and installed software versions are determined for each of the ECUs in the vehicle. The target software version is the desired ECU software version after performing the software update. The installed software version is the presently installed ECU software version. The target and installed software versions are compared. Target ECU software and ECU flash instructions are obtained for each of the ECUs in which the installed software version is not the target software version.

The reflash execution instructions for the software update, including the ECU reflash sequence, are determined depending on the ECUs to be updated. The ECU reflash sequence provides the order in which the target ECUs are updated, maintaining ECU software compatibility among ECUs. In an alternative embodiment, update control parameters, such as the required vehicle state and/or vehicle diagnostic tests, are also determined depending on the ECUs to be updated.

The software update package is assembled from the target ECU software and ECU flash instructions for each target ECU, and the reflash execution instructions. In one embodiment, ECU diagnostic tests for each target ECU are also included in the software update package. In an alternative embodiment, update control parameters are also included in the software update package. In one embodiment, the software update package is secured as a secured software update package by encrypting, compressing, and/or signing the software update package.

Transmitting the software update package over a wireless carrier system to the telematics device of each of the vehicles 206 includes transmitting the software update package from a server to the mobile vehicle. In one embodiment, the server is located at the call center or web-hosting portal, and the wireless carrier system receives the software update package over a land network and a communication network.

Installing the software update package in at least one target ECU for each of the vehicles 208 includes installing the software update package at the mobile vehicle in each of the target ECUs in the sequence directed by the telematics unit. In one embodiment, the software update package includes reflash execution instructions, first target ECU software, first ECU flash instructions, second target ECU software, and second ECU flash instructions. Installing the software update package in at least one target ECU for each of the vehicles 208 includes executing the reflash execution instructions at the telematics device for a specific vehicle, transmitting the first target ECU software and the first ECU flash instructions to a first target ECU in response to the reflash execution instructions, installing the first target ECU software in the first target ECU in response to the first ECU flash instructions, transmitting the second target ECU software and the second ECU flash instructions to a second target ECU in response to the reflash execution instructions; and installing the second target ECU software in the second target ECU in response to the second ECU flash instructions. The installation is repeated for any number of ECUs until each has been updated with the appropriate target ECU software.

In an alternative embodiment, the installed ECU software is uninstalled before the target ECU software is installed. In another alternative embodiment, the target ECU software and ECU flash instructions is secured as a secured target ECU update package by encrypting, compressing, and/or signing the target ECU software and ECU flash instructions at the telematics device. The secured target ECU update package is transmitted to the ECU for installation, and decrypted, uncompressed, and/or signature verified at the target ECU prior to installation.

In alternative embodiments, pre-installation and/or post-installation checking is included in installing the software update package. Pre-installation checking includes security, vehicle state, and ECU software version checking prior to ECU software installation. Security checking includes decrypting, uncompressing, and/or signature verifying the software update package prior to installation when the software update package is a secured software update package. Vehicle state checking includes verifying that the vehicle Is in the desired state, such as inactive and stationary, prior to installation of the software update package when required vehicle state is included as an update control parameter in the software update package. ECU software version checking includes checking that the target ECU has the installed ECU software version and/or the installed ECU calibration file version that is expected, i.e., the installed ECU software version and/or the installed ECU calibration file version found in the determining vehicles within the vehicle groups 202 and used in preparing the software update package 204. Should the pre-installation checking fail, the software update is suspended. In one embodiment, the telematics device requests further instruction from the mobile vehicle communication system, for example from the call center or web-hosting portal. In an alternative embodiment, the telematics device repeats the pre-installation testing later and proceeds with the software update when the pre-installation testing is successful.

Post-installation checking includes ECU diagnostic testing and vehicle diagnostic testing. ECU diagnostic testing includes testing the newly installed ECU software to verify proper operation when an ECU diagnostic test is included in the software update package. In one embodiment, the ECU reports the outcome of the ECU diagnostic testing to the telematics device. Vehicle diagnostic testing includes testing of the software update by the telematics device after all the target ECUs have been updated when a vehicle diagnostic test is included in the software update package. In one embodiment, the telematics device reports the outcome of the vehicle diagnostic testing to the mobile vehicle communication system, such as to the call center or web-hosting portal. Should the post-installation checking fail, the software update is reversed and the software configuration returned to a safe mode or the pre-installation state. In one embodiment, the telematics device requests further instruction from the mobile vehicle communication system, such as from the call center or web-hosting portal.

The remote reflashing method can include reports of the progress and completion of the software updates. In one embodiment, the telematics device reports successful completion of installation of the software update package in a specific vehicle to the mobile vehicle communication system, for example to the call center or web-hosting portal. In an alternative embodiment, the mobile vehicle communication system updates the installed software version recorded for each of the plurality of updated ECUs for each vehicle, for example updating databases at the call center or web-hosting portal. In another alternative embodiment, the mobile vehicle communication system issues intermediate reports showing what percentage of vehicles within the vehicle group being updated have been updated. In yet another alternative embodiment, the mobile vehicle communication system issues a successful update completion report when all vehicles within the vehicle group being updated have been updated. Those skilled in the art will appreciate that additional useful reports can show intermediate and final status of the software updating.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

I claim:

1. A method for remote reflashing of software for electronic control units (ECUs), the method comprising:
   identifying one or more vehicles selected to receive updated ECU software using a database of vehicle information located at a remote facility, wherein the identifying step comprises searching the database using at least one key parameter associated with the vehicle information in the database;
   preparing a software update package that includes the updated ECU software for each of the one or more identified vehicles;
   transmitting the software update package over a wireless carrier system to a telematics device of each of the identified vehicles; and
   installing the updated ECU software in at least one target ECU for each of the identified vehicles.

2. The method of claim 1 further comprising performing preliminary software update planning.

3. The method of claim 1 wherein the step of preparing a software update package comprises:
   determining a target software version for each of a plurality of ECUs installed on the vehicle;
   determining an installed software version for each of the plurality of ECUs using the database;
   comparing the target software version to the installed software version for each of the plurality of ECUs;
   obtaining target ECU software and ECU flash instructions for each of the plurality of ECUs for which the target software version is not the installed software version;
   determining reflash execution instructions; and
   assembling the software update package such that it includes the target ECU software, the ECU flash instructions, and the reflash execution instructions.

4. The method of claim 3 further comprising obtaining ECU diagnostic tests for each of the plurality of ECUs for which the target software version is not the installed software version, and including the ECU diagnostic tests in the software update package.

5. The method of claim 3 further comprising determining update control parameters selected from the group consisting of required vehicle state and vehicle diagnostic tests, and including the update control parameters in the software update package.

6. The method of claim 3 further comprising securing the software update package by a process selected from the group consisting of encrypting, compressing, and signing.

7. The method of claim 1 wherein the software update package includes reflash execution instructions, first target ECU software, first ECU flash instructions, second target ECU software, and second ECU flash instructions, and the step of installing the software update package in at least one target ECU for each of the identified vehicles comprises:
- executing the reflash execution instructions at the telematics device for a specific vehicle;
- transmitting the first target ECU software and the first ECU flash instructions to a first target ECU in response to the reflash execution instructions;
- installing the first target ECU software in the first target ECU in response to the first ECU flash instructions;
- transmitting the second target ECU software and the second ECU flash instructions to a second target ECU in response to the reflash execution instructions; and
- installing the second target ECU software in the second target ECU in response to the second ECU flash instructions.

8. The method of claim 1 wherein the installing the software update package in at least one target ECU for each of the identified vehicles further comprises performing checking selected from the group consisting of pre-installation checking and post-installation checking.

9. The method of claim 1 farther comprising the step of updating an installed software version for each of a plurality of ECUs for each of the identified vehicles.

10. A system for remote reflashing of software for electronic control units (ECUs), the system comprising:
- means for identifying one or more vehicles selected to receive updated ECU software using a database of vehicle information located at a remote facility, wherein the identifying step comprises searching the database using at least one key parameter associated with the vehicle information in the database;
- means for preparing a software update package that includes the updated ECU software for each of the one or more identified vehicles;
- means for transmitting the software update package over a wireless carrier system to a telematics device of each of the identified vehicles; and
- means for installing the updated ECU software in at least one target ECU for each of the identified vehicles.

11. The system of claim 10 wherein the means for preparing a software update package comprises:
- means for determining a target software version for each of a plurality of ECUs installed on the vehicle;
- means for determining an installed software version for each of the plurality of ECUs using the database;
- means for comparing the target software version to the installed software version for each of the plurality of ECUs;
- means for obtaining target ECU software and ECU flash instructions for each of the plurality of ECUs for which the target software version is not the installed software version;
- means for determining reflash execution instructions; and
- means for assembling the software update package such that it includes the target ECU software, the ECU flash instructions, and the reflash execution instructions.

12. The system of claim 11 further comprising means for obtaining ECU diagnostic tests for each of the plurality of ECUs for which the target software version is not the installed software version, and means for including the ECU diagnostic tests in the software update package.

13. The system of claim 11 further comprising means for securing the software update package by a process selected from the group consisting of encrypting, compressing, and signing.

14. The system of claim 10 wherein the software update package includes reflash execution instructions, first target ECU software, first ECU flash instructions, second target ECU software, and second ECU flash instructions, and the means for installing the software update package in at least one target ECU for each of the identified vehicles comprises:
- means for executing the reflash execution instructions at the telematics device for a specific vehicle;
- means for transmitting the first target ECU software and the first ECU flash instructions to a first target ECU in response to the reflash execution instructions;
- means for installing the first target ECU software in the first target ECU in response to the first ECU flash instructions;
- means for transmitting the second target ECU software and the second ECU flash instructions to a second target ECU in response to the reflash execution instructions; and
- means for installing the second target ECU software in the second target ECU in response to the second ECU flash instructions.

15. A method for remote reflashing of software for electronic control units (ECUs), comprising the steps of:
- wirelessly receiving a software update package at a vehicle via a telematics unit;
- obtaining from the software update package a set of reflash execution instructions that identify either an ECU reflash sequence or a required vehicle state, or both;
- obtaining from the software update package an ECU update containing new ECU operating software or calibration data, or both;
- carrying out the reflash execution instructions by placing the vehicle in any required vehicle state and reprogramming one or more ECUs with the ECU update, wherein reprogramming of multiple ECUs is carried out according to any ECU reflash sequence contained in the software update package.

16. The method of claim 15, wherein the step of carrying out the reflash execution instructions further comprises reprogramming a plurality of the ECUs in an order specified by the reflash execution instructions.

17. The method of claim 16, further comprising the step of preparing the reflash execution instructions by selecting the specified order of reprogramming of ECUs such that software compatibility among the ECUs is maintained.

18. The method of claim 15, wherein the reflash execution instructions specify both the ECU reflash sequence and the required vehicle state.

* * * * *